W. F. KIESEL, Jr.
BRAKE HANGER.
APPLICATION FILED SEPT. 30, 1913.
1,098,808. Patented June 2, 1914.
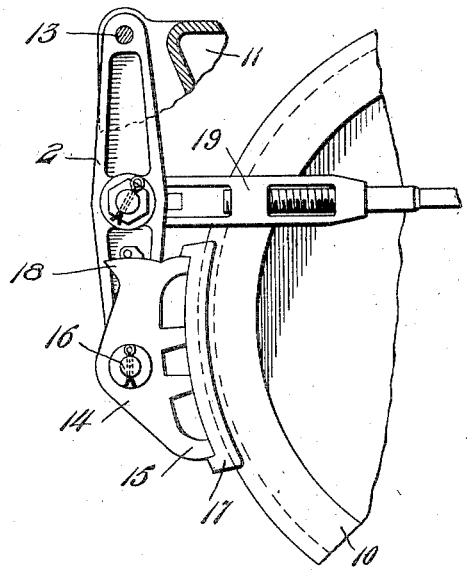
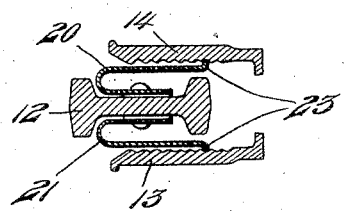
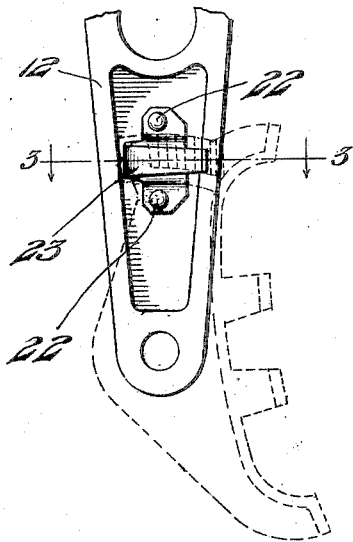
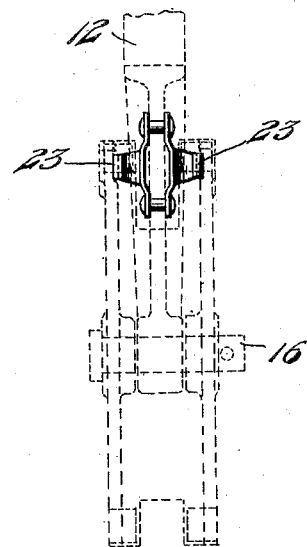
Witnesses
B. M. Offutt
B. M. Kent
Inventor
W. F. Kiesel Jr.
by Foster Furman Watson & Coit
Attorneys

UNITED STATES PATENT OFFICE.

WILLIAM F. KIESEL, JR., OF ALTOONA, PENNSYLVANIA.

BRAKE-HANGER.

1,098,808.

Specification of Letters Patent.

Patented June 2, 1914.

Application filed September 30, 1913. Serial No. 792,633.

*To all whom it may concern:*

Be it known that I, WILLIAM F. KIESEL, Jr., a citizen of the United States, residing at Altoona, in the county of Blair and State of Pennsylvania, have invented certain new and useful Improvements in Brake-Hangers, of which the following is a specification.

This invention relates to car brakes, and more particularly to improved means for providing an automatic adjustment for the brake head whereby the latter will be held out of contact with the car wheel, when released, and will also automatically adjust itself for wear of the brake shoe and the wheel.

The invention also has for one of its objects the provision of improved means for preventing the brake head from rattling.

The novel features of the invention will be apparent from the following description, taken in connection with the accompanying drawing, in which:

Figure 1 is a fragmentary side elevation of a car wheel and the brake therefor. Fig. 2 is a fragmentary side elevation of the brake lever, the brake head being shown in broken lines. Fig. 3 is a section on the line 3—3 of Fig. 2, and Fig. 4 is an elevation of my improvement with the brake lever and brake head shown in broken lines.

Referring to the drawings, 10 indicates the car wheel, 11 a portion of the car truck, and 12 a vertically arranged brake lever which is pivoted to the truck at 13. The brake lever 12 has its lower end arranged between the side walls 13 and 14 of the brake head 15, the lever being connected with the side walls by means of a pivot pin 16. The brake head 15 carries the usual brake shoe 17, and the walls 13 and 14 have extensions 18 at their upper ends. The brake lever 12 is actuated by means of the usual brake rod 19.

It will be evident from Fig. 1 that it is essential to provide means for holding the brake head so that it will not turn on the pivot pin 16 when the brake is released, otherwise the upper end of the brake shoe 17 would bear against the wheel and be subject to wear and also rattle. In order to hold the brake head against turning on the pin 16 under the influence of gravity, I have provided on opposite sides of the lever 12 the leaf springs 20 and 21, these springs being secured to the lever by means of rivets 22 and having their free ends 23 in engagement with the corrugated inner extensions 18 of the walls 13 and 14 of the brake head. (See Fig. 3.) These leaf springs engage the side walls 13 and 14 of the brake head with sufficient force to hold the latter against turning movement on the pin 16 under the influence of gravity, and at the same time permit the brake head to adjust itself to wear of the wheel and brake shoe. The springs also prevent rattling of the brake head, and the side walls 13 and 14 of the brake head protect the springs.

Having thus described my invention, what I claim is:—

1. In a car brake, the combination of a brake head having spaced side walls, a vertically arranged lever having its lower end between said walls and pivoted thereto, and spring means arranged between said walls at a point remote from said pivot and forming an automatically adjusting connection between the lever and the head above the pivotal connection therebetween.

2. In a car brake, the combination of a brake head having spaced side walls, a vertically arranged lever having its lower end between said walls and pivoted thereto, and a leaf spring arranged between said lever and the inner side of one of said walls above the pivotal connection therebetween and forming an automatically adjusting connection between the lever and the head.

3. In a car brake, the combination of a brake head having spaced side walls, a vertically arranged lever having its lower end between said walls and pivoted thereto, and leaf springs arranged on opposite sides of said lever between said walls at a point remote from the pivotal connection therebetween and forming an automatically adjusting connection between the lever and the head.

4. In a car brake, the combination of a brake head having spaced side walls, a vertically arranged lever having its lower end between said walls and pivoted thereto, and leaf springs secured on opposite sides of said lever at a point remote from the pivotal connection and engaging the inner sides of said walls, the walls being corrugated where engaged by the springs.

In testimony whereof I affix my signature in presence of two witnesses.

WILLIAM F. KIESEL, Jr.

Witnesses:
J. C. STORM,
W. R. FORSTER.